No. 854,599. PATENTED MAY 21, 1907.
M. PEDERSEN.
GEARING FOR BICYCLES, &c.
APPLICATION FILED AUG. 11, 1903.
3 SHEETS—SHEET 1.
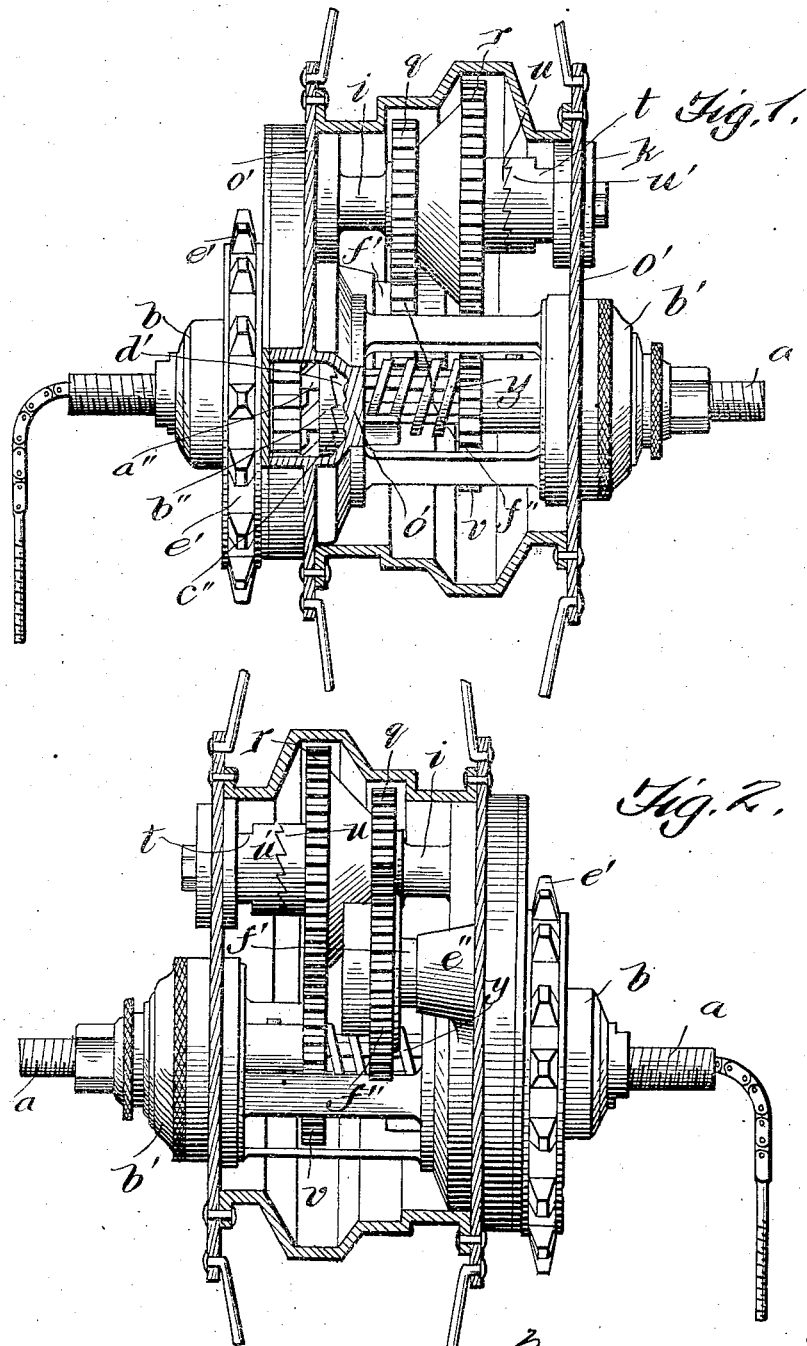

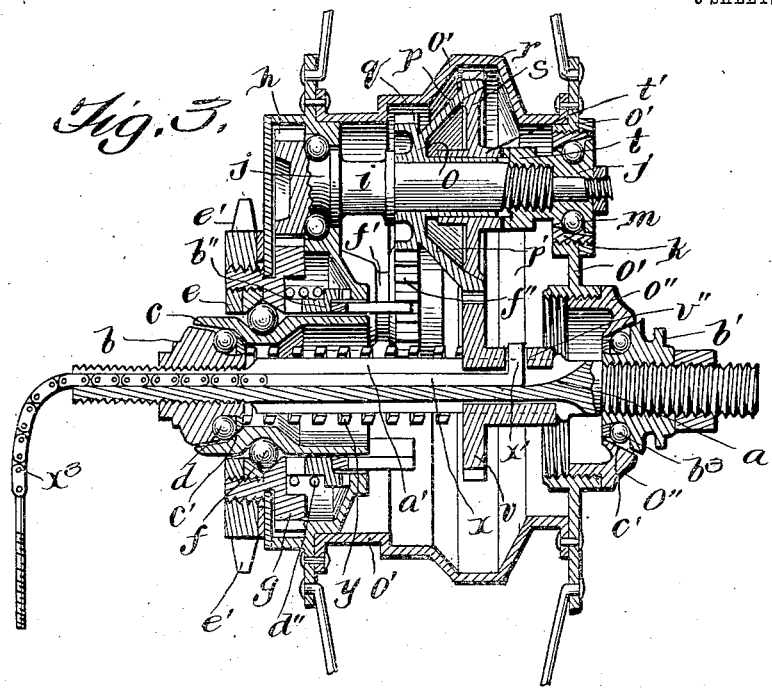
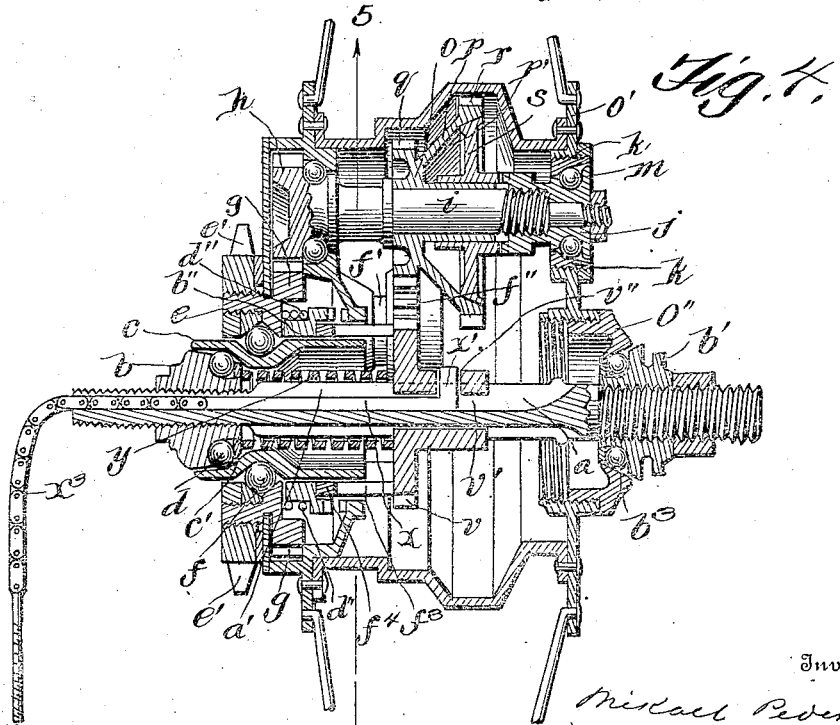

No. 854,599.

PATENTED MAY 21, 1907.

M. PEDERSEN.
GEARING FOR BICYCLES, &c.
APPLICATION FILED AUG. 11, 1903.

3 SHEETS—SHEET 3.

Witnesses
R. A. Boswell.
L. P. Brock.

Inventor
Mikael Pedersen
By Chas. A. ...
Attorney

UNITED STATES PATENT OFFICE.

MIKAEL PEDERSEN, OF DURSLEY, ENGLAND.

GEARING FOR BICYCLES, &c.

No. 854,599.    Specification of Letters Patent.    Patented May 21, 1907.

Application filed August 11, 1903. Serial No. 169,107.

*To all whom it may concern:*

Be it known that I, MIKAEL PEDERSEN, a British subject, and a resident of Raglan House, Dursley, in the county of Gloucester, England, have invented certain new and useful Improvements in Gearing for Bicycles, Motors, Intermediate Motions, and other Mechanical Purposes; and I hereby declare that the following is a full, clear, and exact description of the same.

This invention relates to an improvement in gearing for bicycles, motor cars, motors, intermediate motions and other mechanical purposes, constructed and arranged as hereinafter described and particularly pointed out in the appended claims.

Figure 5:
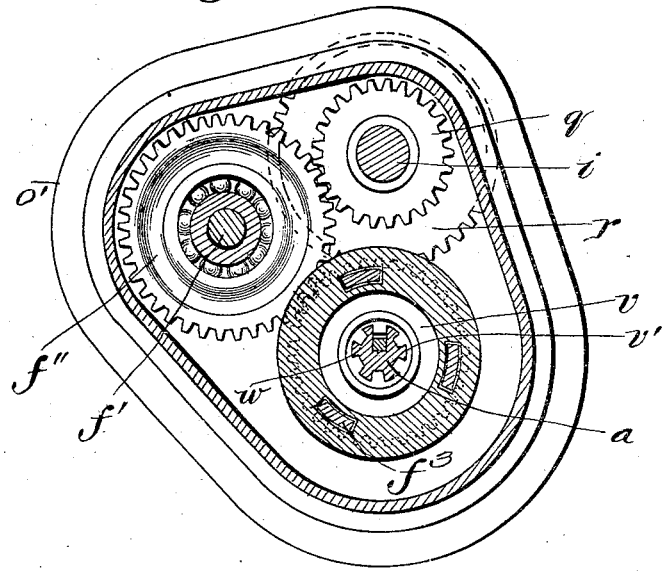
Figures 6, 7, 8:
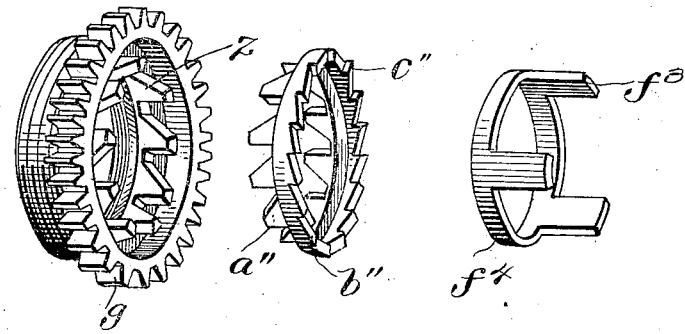

For a full understanding of the invention reference is to be had to the following description and to the accompanying drawings in which, Figure 1 is an elevation partly in section of the gearing, showing the sliding spur wheel in mesh with the high speed planet wheel. Fig. 2 is a similar view looking at the gearing from the opposite side to that shown in Fig. 1. Fig. 3 is a sectional view with the parts in the position shown in Figs. 1 and 2. Fig. 4 is a sectional view with the sliding spur wheel in mesh with the low speed planet wheels. Fig. 5 is a sectional view on the line 5 5 Fig. 4. Fig. 6 is a perspective view of the sprocket driven spur wheel and clutch member. Figs. 7 and 8 are perspective views of the clutch members co-acting with the clutch member shown in Fig. 6.

Like characters of reference refer to like parts throughout the specification and drawings.

The axle $a$ for the driving hub is stationarily mounted in the frame of the machine and adjustably fixed on it are two anti-friction cones $b$ $b'$. Surrounding the anti-friction cone $b'$ is one of the hubs $o''$ of the hub shell $o'$ and interposed between the hub $o''$ and anti-friction cone $b'$ are anti-friction balls $b^3$. Inclosing the anti-friction cone $b$ is a sleeve $c$ having a ball-race $c'$ and interposed between the anti-friction cone $b$ and the ball-race $c'$ are anti-friction balls $d$. Encircling the sleeve $c$ is the hub $e$ of the sprocket wheel $e'$ and interposed between the sprocket wheel hub $e$ and the outer surface of the sleeve $c$ are anti-friction balls $f$. Secured to or forming part of the sprocket wheel hub $e$ is a spur wheel $g$ the teeth of which mesh with the teeth of the pinion wheel $h$ mounted on and revoluble with the planet spindle $i$. The planet spindle $i$, fitted with anti-friction cones $j$, is journaled in bearings $k$ forming part of the hub shell $o'$. Interposed between the adjacent surfaces of the anti-friction cones $j$ and bearings $k$ are anti-friction balls $m$. Loosely mounted on the planet spindle $i$ is a double spur wheel consisting of a hub $o$, spur teeth $q$ encircling the hub and constituting a pinion, which will hereinafter be designated by that reference letter, a friction cone $p$ projecting from the hub $o$ and having gear teeth $r$ constituting a spur wheel which will be designated by the latter reference letter. The clutch surface $p'$ of the friction cone $p$ is opposed to a friction cone $s$ having a hub $t'$ slidably mounted on the planet spindle but revoluble therewith. On the planet spindle $i$ adjacent to the outer end of the hub $t'$ is a collar $t$ forming part of the anti-friction cone $j$. The adjacent faces of the hub $t'$ and the collar $t$ are provided with intermeshing ratchet shaped teeth $u$ $u'$, see Figs. 1 and 2, which engage when the planet spindle is driven by the spur wheel $g$ and pinion $h$. The collar $t$ is so positioned on the shaft or axle $a$ as to allow of a limited movement of the hub $t'$ on the planet spindle so that the friction cone $s$ can free itself from engagement with the clutch surface $p'$ while free wheeling and when the teeth $u$, $u'$ are inactive.

Slidably mounted upon the axle $a$ is a spur wheel $v$ having the bore of its hub grooved as at $v'$, see Fig. 5, to receive the feathers $w$ forming part of the axle $a$ which prevent it revolving on the axle. Formed in the axle $a$ is a longitudinal groove $a'$ and contained in the groove $a'$ is a shifting rod $x$ having at its inner end a crank arm $x'$ to enter the recess $v''$ in the hub of the spur wheel $v$. The outer end of the shifting rod $x$ extends beyond the anti-friction cone $b$ and is connected to a flexible shifting member $x^3$. Encircling the shaft or axle $a$ is a coiled spring $y$ which bears against the anti-friction cone $b$ and the adjacent side face of the spur wheel $v$ to press the spur wheel $v$ in the direction of the teeth of the spur wheel $r$. Projecting from the spur wheel $g$ are clutch teeth $z$ see Figs. 6, 7 and 8, which engage with the clutch teeth $a''$ of the clutch member and which are so formed as to permit of a limited movement of the clutch member $b''$ lengthwise of the axle. The clutch member $b''$ encircles the sleeve $c$ and is formed with ratchet teeth $c''$ to engage with the ratchet teeth $d'$ of the hub shell $o'$ see Fig. 1. Encircling the clutch teeth $a''$ and bearing against the spur wheel $g$ and the clutch member $b''$ is a coiled spring $d''$ to press the clutch member $b''$ in the direction of the hub shell $o'$ so that its ratchet teeth $c''$ will normally engage with the ratchet teeth $d'$. Journaled in bearings $e''$ forming part of or connected to the hub shell $o'$ is a counter-spindle $f''$ upon which is mounted a pinion $f'''$ constantly in mesh with the pinion $q$, and with which the spur wheel $v$ can be positioned to mesh, as hereinafter described. When the spur wheel $v$ is in a neutral position, i. e. when positioned on the axle $a$ to be out of mesh with the spur wheel $r$ and the pinion $f'''$, the motion of the sprocket wheel $e'$ is then transmitted to the clutch member $b''$ by the engagement of the clutch teeth $z$ and $a''$ and by the clutch member $b''$ to the hub shell $o'$ by the engagement of the ratchet teeth $c''$ and $d'$ to cause the united revolution of the sprocket wheel and hub shell at what is termed the intermediate speed of the gearing. While the hub shell $o'$ is revolving unitedly with the sprocket wheel $e'$, motion is transmitted by the spur wheel $g$ to the pinion wheel $h$ and planet spindle $i$ with which the spur wheel $r$ and pinion wheel $q$ unitedly revolve but as the spur wheel $v$ is out of mesh with the pinion $f'''$ and spur wheel $r$ the latter are inactive, i. e. they are performing no function which will vary the speed of the hub shell from that of the sprocket wheel while the spur wheel $v$ is so positioned. By releasing the shifting rod $x$, the spring $y$ moves the spur wheel $v$ into engagement with the teeth of the spur wheel $r$ as shown in Fig. 3. The motion of the sprocket wheel $e'$ is then transmitted to the spur wheel $g$ and from the spur wheel $g$ to the pinion $h$ and planet spindle $i$. The motion of the planet spindle $i$ causes the revolution of the spur wheel $r$, the teeth of which are in mesh with the teeth of the spur wheel $v$, and the spur wheel $r$ then makes a planetary revolution around the axle $a$ and carries with it the hub shell $o'$, the number of planetary revolutions which the hub shell $o'$ makes to one revolution of the axle $a$ being regulated by the ratios of the diameters of the pinion $h$ and spur wheel $g$.

As shown in Figs. 3 and 4, the diameter of the pinion $h$ is less than the diameter of the spur wheel $g$ with the result that the planetary speed of the revolution of the planet spindle, carrying with it the hub shell $o'$, will exceed that of the sprocket wheel $e'$ and cause the hub shell $o'$ during the intermeshing of the teeth of the spur wheels $r$ and $v$ to perform a greater number of revolutions per minute around the axis of the shaft or axle $a$ than the sprocket wheel $e'$ this being termed the high speed of the gearing. During the revolution of the hub shell $o'$ around the axle $a$ while the spur wheels $r$ and $v$ are in mesh, the clutch teeth $d'$ override the clutch teeth $c''$, the spring $d''$ yielding and automatically permitting of the longitudinal displacement of the clutch member $b''$ for that purpose.

As the spur wheel $v$ moves into mesh with the pinion $f'''$ it engages the lugs $f^3$ projecting laterally from an annular band $f^4$. The annular band $f^4$ contacts the clutch member $b''$ and when the spur wheel $v$ engages the lugs $f^3$ and moves the annular band $f^4$ against the clutch member $b''$ it moves the latter to disengage the clutch teeth $c''$ from the clutch teeth $d'$ so that the clutch teeth $c''$ may pass the clutch teeth $d'$ while the sprocket wheel and clutch member $b''$ are moving at a higher rate of speed than the speed of the hub shell. The pinion $f'''$ is constantly in mesh with, but of greater diameter than the pinion $q$ and when driven necessarily makes a less number of revolutions than the latter. When the spur wheel $v$ is in mesh with the pinion $f'''$ motion is transmitted from the planet spindle $i$ to the pinion $q$ in the manner previously described.

The pinion $q$ meshing with the pinion $f'''$ revolves the latter in the reverse direction to its own revolution and when the spur wheel $v$ is in mesh with the pinion $f'''$ the speed of the planetary revolution of the pinion $h$ around the spur wheel $g$ and the planet spindle $i$ and hub shell $o'$ around the axle $a$ is reduced proportionately to the retardation offered by the reverse revolution of the pinion $f'''$ which owing to the diameter of the pinion $f'''$ being greater than that of the pinion $h$ is not sufficient to reverse the direction of the revolution of the hub shell, but it is sufficient to cause the hub shell $o'$ to move at a slower rate of speed than the spur wheel $g$ which is termed the low speed of the gearing.

Having thus fully described my invention what I claim as new and desire to secure by Letters Patent is:

1. A gearing for bicycles, motor cars, motors and the like comprising, an axle, a drive wheel, a spur wheel driven by the drive wheel, a planet spindle, a pinion on the planet spindle meshing with the spur wheel, a spur wheel loosely mounted on the planet spindle, a friction clutch causing the united revolution of the last mentioned spur wheel and planet spindle, a spur wheel slidingly mounted on the axle and means to selectively position the sliding spur wheel.

2. A gearing for bicycles, motor cars, motors and the like comprising, an axle, a drive wheel, a spur wheel driven by the drive wheel, a planet spindle, a pinion on the planet spindle meshing with the spur wheel, a spur wheel loosely mounted on the planet spindle, a friction clutch causing the united revolution of the last mentioned spur wheel and planet spindle, a spur wheel slidingly mounted on the axle, means to selectively position the sliding spur wheel, a pinion integral with the spur wheel on the planet spindle, a counter spindle, and a pinion on the counter spindle meshing with the last mentioned pinion.

3. A gearing for bicycles, motor cars, motors and the like, comprising an axle, a drive wheel, a hub shell, a clutch member for the drive wheel, a clutch member for the hub shell, an intermediate clutch member interposed between, and engaging with, the clutch members of the drive wheel and hub shell, a spur wheel movable lengthwise on the axle, an actuating means for the intermediate clutch member, engaged by the movable spur wheel, a planet spindle, a spur wheel mounted thereon and engaging with the movable spur wheel, a clutch causing the united revolution of the planet spindle and spur wheel thereon and a pinion fixed on the planet spindle actuated by the drive wheel.

4. A gearing for bicycles, motor cars, motors and the like comprising an axle, a drive wheel, a hub shell, a clutch member for the drive wheel, a clutch member for the hub shell, an intermediate clutch member interposed between, and engaging with, the clutch members of the drive wheel and hub shell, a spur wheel movable lengthwise on the axle, an actuating means for the intermediate clutch member, engaged by the movable spur wheel, a planet spindle, a spur wheel loosely mounted thereon and engaging with the movable spur wheel, a clutch causing the united revolution of the planet spindle and spur wheel thereon, a pinion fixed on the planet spindle actuated by the drive wheel, a pinion carried by the spur wheel on the planet spindle, a counter spindle, and a pinion on the counter spindle meshing with the last mentioned pinion.

5. A gearing for bicycles, motor cars, motors and the like, comprising an axle, a drive wheel, a hub shell, a clutch member for the drive wheel, a clutch member for the hub shell, an intermediate clutch member interposed between, and engaging with, the clutch members of the drive wheel and hub shell, a spur wheel movable lengthwise on the axle, an actuating means for the intermediate clutch member, engaged by the movable spur wheel, a planet spindle, a spur wheel loosely mounted thereon and engaging with the movable spur wheel, a clutch causing the united revolution of the planet spindle and spur wheel thereon, a pinion fixed on the planet spindle actuated by the drive wheel, and a spring normally pressing the movable spur wheel into mesh with the spur wheel on the planet spindle.

6. A gearing for bicycles, motor cars, motors and the like comprising an axle, a drive wheel, a hub shell, a clutch member for the drive wheel, a clutch member for the hub shell, an intermediate clutch member interposed between, and engaging with, the clutch members of the drive wheel and hub shell, a spur wheel movable lengthwise on the axle, an actuating means for the intermediate clutch member engaged by the movable spur wheel, a planet spindle, a spur wheel loosely mounted thereon and engaging with the movable spur wheel, a clutch causing the united revolution of the planet spindle and spur wheel thereon, a pinion fixed on the planet spindle actuated by the drive wheel a pinion carried by the spur wheel on the planet spindle, a counter spindle, a pinion on the counter spindle meshing with the last mentioned pinion, and a spring normally pressing the movable spur wheel into mesh with the spur wheel on the planet spindle.

7. A gearing for bicycles, motor cars, motors and the like comprising an axle, a drive wheel, a hub shell, a clutch member for the drive wheel, a clutch member for the hub shell, an intermediate clutch member interposed between, and engaging, with the clutch members of the drive wheel and hub shell, a spur wheel movable lengthwise on the axle, an actuating means for the intermediate clutch member, engaged by the movable spur wheel, a planet spindle, a spur wheel loosely mounted thereon and engaging with the movable spur wheel, a clutch causing the united revolution of the planet spindle and spur wheel thereon, a pinion fixed on the planet spindle actuated by the drive wheel, a spring normally pressing the movable spur wheel into mesh with the spur wheel on the planet spindle, and means for shifting the movable spur wheel on the axle.

8. A gearing for bicycles, motor cars, motors and the like comprising an axle, a drive wheel, a hub shell, a clutch member for the drive wheel, a clutch member for the hub shell, an intermediate clutch member interposed between, and engaging with, the clutch members of the drive wheel and hub shell, a spur wheel movable lengthwise on the axle, an actuating means for the intermediate clutch member engaged by the movable spur wheel, a planet spindle, a spur wheel loosely mounted thereon and engaging with the movable spur wheel, a clutch causing the united revolution of the planet spindle and spur wheel thereon, a pinion fixed on the planet spindle actuated by the drive wheel, a pinion carried by the spur wheel on the planet spindle, a counter spindle, a pinion on the counter spindle meshing with the last mentioned pinion, a spring normally pressing the movable spur wheel into mesh with the spur wheel on the planet spindle and means for shifting the movable spur wheel on the axle.

In witness whereof I have hereunto set my hand in the presence of two witnesses.

MIKAEL PEDERSEN.

Witnesses:
WALKER H. E. BARTLAM,
JUSTUS JONES.